United States Patent
Flory et al.

(10) Patent No.: US 11,015,043 B2
(45) Date of Patent: May 25, 2021

(54) CONDUCTOR JACKET AND PROCESS FOR PRODUCING SAME

(71) Applicant: Dow Global Technologies LLC, Midland, MI (US)

(72) Inventors: Anny L. Flory, Collegeville, PA (US); Mohamed Esseghir, Collegeville, PA (US); Chester J. Kmiec, Collegeville, PA (US); Rajen M. Patel, Freeport, TX (US); Karl M. Seven, Collegeville, PA (US)

(73) Assignee: Dow Global Technologies LLC, Midland, MI (US)

( * ) Notice: Subject to any disclaimer, the term of this patent is extended or adjusted under 35 U.S.C. 154(b) by 91 days.

(21) Appl. No.: 16/470,726

(22) PCT Filed: Dec. 18, 2017

(86) PCT No.: PCT/US2017/066930
§ 371 (c)(1),
(2) Date: Jun. 18, 2019

(87) PCT Pub. No.: WO2018/118741
PCT Pub. Date: Jun. 28, 2018

(65) Prior Publication Data
US 2020/0087494 A1    Mar. 19, 2020

Related U.S. Application Data

(60) Provisional application No. 62/435,985, filed on Dec. 19, 2016.

(51) Int. Cl.
*C08L 23/06* (2006.01)
*H01B 13/22* (2006.01)
*C08L 23/08* (2006.01)

(52) U.S. Cl.
CPC ........... *C08L 23/0815* (2013.01); *C08L 23/06* (2013.01); *C08L 2203/206* (2013.01); *C08L 2205/025* (2013.01); *C08L 2207/066* (2013.01); *H01B 13/22* (2013.01)

(58) Field of Classification Search
CPC ................. C08L 23/06; C08L 23/0815; C08L 2203/20; C08L 2203/206; C08L 2205/025; C08L 2203/202; C08L 2207/066; H01B 13/22
See application file for complete search history.

(56) References Cited

U.S. PATENT DOCUMENTS

| | | | |
|---|---|---|---|
| 3,936,523 A * | 2/1976 | Kleeberg et al. | .... C08K 5/3492 264/211 |
| 6,063,871 A | 5/2000 | Kishine et al. | |
| 6,329,054 B1 | 12/2001 | Rogestedt et al. | |
| 6,346,575 B1 | 2/2002 | Debras et al. | |
| 6,509,106 B1 | 1/2003 | Edwards et al. | |
| 6,566,450 B2 | 5/2003 | Debras et al. | |
| 7,037,977 B2 | 5/2006 | Miserque et al. | |
| 7,230,054 B2 | 6/2007 | Mavrdis et al. | |
| 7,250,474 B2 | 7/2007 | Maziers | |
| 7,514,504 B2 | 4/2009 | Snioy et al. | |
| 7,750,083 B2 | 7/2010 | De Cambry De Baudimont et al. | |
| 7,812,094 B2 | 10/2010 | Kvamme et al. | |
| 7,943,700 B2 | 5/2011 | Crowther et al. | |
| 7,989,549 B2 | 8/2011 | Zhou et al. | |
| 9,181,421 B2 | 11/2015 | Michie, Jr. et al. | |
| 9,512,307 B2 | 12/2016 | Mather et al. | |
| 9,783,662 B2 | 10/2017 | Wang et al. | |
| 2003/0088021 A1 | 5/2003 | Van Dun et al. | |
| 2004/0018101 A1 | 1/2004 | Mahoney | |
| 2004/0062942 A1 | 4/2004 | Lustiger et al. | |
| 2005/0119413 A1 | 6/2005 | Maziers | |
| 2010/0084158 A1 | 4/2010 | Gau et al. | |
| 2015/0315401 A1 | 11/2015 | Lee | |
| 2017/0022309 A1 * | 1/2017 | Vanderlende et al. ....................... C08F 210/02 |
| 2017/0190889 A1 | 7/2017 | Wang | |
| 2017/0267800 A1 * | 9/2017 | Tajima | ................... C08K 13/02 |
| 2017/0335086 A1 * | 11/2017 | Leano et al. | ............ C08L 23/06 |
| 2019/0225782 A1 | 7/2019 | Bin Rusayyis et al. | |
| 2019/0284382 A1 * | 9/2019 | Tuberquia et al. | ..... C08L 53/00 |

FOREIGN PATENT DOCUMENTS

| | | |
|---|---|---|
| EP | 0100843 A1 | 2/1984 |
| EP | 989140 A1 | 3/2000 |
| EP | 1739110 A1 | 1/2007 |
| EP | 1198484 B1 | 7/2007 |
| EP | 2182326 A1 | 5/2010 |
| EP | 1730230 B1 | 5/2012 |
| EP | 3088458 B1 | 8/2017 |
| WO | 02/085954 A2 | 10/2002 |

OTHER PUBLICATIONS

International Search Report and Written Opinion for International Application No. PCT/US2017/066930 dated Jun. 18, 2018, 9 pages.

* cited by examiner

*Primary Examiner* — Peter A Salamon
(74) *Attorney, Agent, or Firm* — Quarles & Brady LLP

(57) ABSTRACT

The present disclosure provides a process. In an embodiment, the process includes blending a broad molecular weight distribution (MWD) ethylene-based polymer having an I21/I2 ratio from 55 to 85 with a narrow MWD ethylene-based polymer having an I21/I2 ratio from 20 to 50. The process includes forming a blend component comprising from 20 wt % to 45 wt % of the broad MWD ethylene-based polymer, from 80 wt % to 55 wt % of the narrow MWD ethylene-based polymer, and optional carbon black. The blend component has a density from 0.925 g/cc to 0.955 g/cc and an I21/I2 ratio from 30 to 55. The process includes extruding the blend component over a conductor at a rate greater than 1.02 m/s, and forming a conductor jacket having a surface smoothness from 30 µ-inch to 80 µ-inch.

14 Claims, No Drawings

CONDUCTOR JACKET AND PROCESS FOR PRODUCING SAME

BACKGROUND

Cables, such as power cables or communication cables, are a type of conductor which include an inner conducting element such as a metal wire or a glass fiber, and one or more outer layers for shielding and protecting purposes. The outermost layer of the cable is a protective layer typically referred to as the outer sheath or outer jacket.

Known is ethylene-based polymer for the manufacture of cable jackets. Ethylene-based polymer for use in cable jackets should possess good processability, such as good extrusion properties at broad processing temperature ranges. Furthermore, such ethylene-based cable jackets should generally possess good mechanical properties. However, cable jacket compounds made from ethylene-based solution resins (SR resins) do not process well on extrusion equipment resulting in unacceptable surface smoothness at typical extrusion line speed when compared to equivalent compounds based on broader molecular weight distribution (MWD) gas phase polymerization resins (GP resins).

The art recognizes the need to diversify and broaden the types of polymeric resins available for use in cable jacket applications while maintaining suitable processability and suitable mechanical and performance properties.

SUMMARY

The present disclosure is directed to a process for producing a conductor jacket, such as a cable jacket. The present process improves the processability of SR resins by blending with a GP resin and subsequently extruding the blend to produce a conductor jacket with acceptable surface smoothness and improved tensile properties.

The present disclosure provides a process. In an embodiment, the process includes blending a broad molecular weight distribution (MWD) ethylene-based polymer having an I21/I2 ratio from 55 to 85 with a narrow MWD ethylene-based polymer having an I21/I2 ratio from 20 to 50. The process includes forming a blend component comprising from 20 wt % to 45 wt % of the broad MWD ethylene-based polymer, from 80 wt % to 55 wt % of the narrow MWD ethylene-based polymer and optional carbon black. The blend component has a density from 0.925 g/cc to 0.955 g/cc and an I21/I2 ratio from 30 to 55. The process includes extruding the blend component over a conductor at a rate greater than 1.02 m/s, and forming a conductor jacket having a surface smoothness from 30 µ-inch to 80 µ-inch.

The present disclosure provides another process. In an embodiment, the process includes blending a broad molecular weight distribution (MWD) ethylene-based polymer having an I21/I2 ratio from 55 to 85 with a narrow MWD ethylene-based polymer having an I21/I2 ratio from 20 to 50. The process includes forming a blend component comprising from 20 wt % to 70 wt % of the broad MWD ethylene-based polymer, from 80 wt % to 20 wt % of the narrow MWD ethylene-based polymer and optional carbon black. The blend component has a density from 0.925 g/cc to 0.955 g/cc and an I21/I2 ratio from 15 to 65. The process includes extruding the blend component over a conductor at a rate greater than 1.02 m/s, and forming a conductor jacket having a surface smoothness from 20 µ-inch to 80 µ-inch.

Definitions

All references to the Periodic Table of the Elements herein shall refer to the Periodic Table of the Elements, published and copyrighted by CRC Press, Inc., 2003. Also, any references to a Group or Groups shall be to the Groups or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference), especially with respect to the disclosure of synthetic techniques, definitions (to the extent not inconsistent with any definitions provided herein) and general knowledge in the art.

The numerical ranges disclosed herein include all values from, and including, the lower value and the upper value. For ranges containing explicit values (e.g., 1 or 2, or 3 to 5, or 6, or 7) any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight, and all test methods are current as of the filing date of this disclosure.

The term "composition," as used herein, refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

A "conductor" is one or more wire(s), or one or more fiber(s), for conducting heat, light, and/or electricity. The conductor may be a single-wire/fiber or a multi-wire/fiber and may be in strand form or in tubular form. Non-limiting examples of suitable conductors include carbon and various metals, such as silver, gold, copper, and aluminum. The conductor may also be optical fiber made from either glass or plastic. The conductor may or may not be disposed in a protective sheath. A "cable" is a conductor whereby two or more wires, or two or more optical fibers, are bound together, optionally in a common insulation covering. The individual wires or fibers inside the covering may be bare, covered, or insulated. Combination cables may contain both electrical wires and optical fibers. The cable can be designed for low, medium, and/or high voltage applications.

Density is measured in accordance with ASTM D 792 with values reported in grams per cubic centimeter (g/cc or $g/cm^3$).

An "ethylene-based polymer" is a polymer that contains more than 50 weight percent polymerized ethylene monomer (based on the total weight of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably. Non-limiting examples of ethylene-based polymer (polyethylene) include low density polyethylene (LDPE) and linear polyethylene. Non-limiting examples of linear polyethylene include linear low density polyethylene (LLDPE), ultra low density polyethylene (ULDPE), very low density polyethylene (VLDPE), multi-component ethylene-based copolymer (EPE), ethylene/α-olefin multi-block copolymers (also known as olefin block copolymer (OBC)), single-site catalyzed linear low density polyethylene (m-LLDPE), substantially linear, or linear, plastomers/elastomers, medium density polyethylene (MDPE), and high density polyethylene (HDPE). Generally, polyethylene may be produced in gas-phase, fluidized bed reactors, liquid phase slurry process reactors, or liquid phase solution process reactors, using a heterogeneous catalyst system, such as Ziegler-Natta catalyst, a homogeneous catalyst system, comprising Group 4 transition metals and ligand structures such as metallocene, non-metallocene metal-centered, heteroaryl, heterovalent aryloxyether, phosphinimine, and others. Combinations of heterogeneous and/or homogeneous catalysts also may be used in either single reactor or dual reactor configurations.

"Ethylene plastomers/elastomers" are substantially linear, or linear, ethylene/α-olefin copolymers containing homogeneous short-chain branching distribution comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. Ethylene plastomers/elastomers have a density from 0.870 g/cc, or 0.880 g/cc, or 0.890 g/cc to 0.900 g/cc, or 0.902 g/cc, or 0.904 g/cc, or 0.909 g/cc, or 0.910 g/cc, or 0.917 g/cc. Nonlimiting examples of ethylene plastomers/elastomers include AFFINITY™ plastomers and elastomers (available from The Dow Chemical Company), EXACT™ Plastomers (available from ExxonMobil Chemical), Tafmer™ (available from Mitsui), Nexlene™ (available from SK Chemicals Co.), and Lucene™ (available LG Chem Ltd.).

"High density polyethylene" (or "HDPE") is an ethylene homopolymer or an ethylene/α-olefin copolymer with at least one $C_4$-$C_{10}$ α-olefin comonomer, or $C_4$ α-olefin comonomer and a density from greater than 0.94 g/cc, or 0.945 g/cc, or 0.95 g/cc, or 0.955 g/cc to 0.96 g/cc, or 0.97 g/cc, or 0.98 g/cc. The HDPE can be a monomodal copolymer or a multimodal copolymer. A "monomodal ethylene copolymer" is an ethylene/$C_4$-$C_{10}$ α-olefin copolymer that has one distinct peak in a gel permeation chromatography (GPC) showing the molecular weight distribution.

A "jacket" is a coating on the conductor.

"Linear low density polyethylene" (or "LLDPE") is a linear ethylene/α-olefin copolymer containing heterogeneous short-chain branching distribution comprising units derived from ethylene and units derived from at least one $C_3$-$C_{10}$ α-olefin comonomer or at least one $C_4$-$C_8$ α-olefin comonomer, or at least one $C_6$-$C_8$ α-olefin comonomer. LLDPE is characterized by little, if any, long chain branching, in contrast to conventional LDPE. LLDPE has a density from 0.916 g/cc to 0.925 g/cc. Nonlimiting examples of LLDPE include TUFLIN™ linear low density polyethylene resins (available from The Dow Chemical Company), DOWLEX™ polyethylene resins (available from the Dow Chemical Company), and MARLEX™ polyethylene (available from Chevron Phillips).

"Low density polyethylene" (or "LDPE") is an ethylene homopolymer, or an ethylene/α-olefin copolymer comprising at least one $C_3$-$C_{10}$ α-olefin, or a $C_3$-$C_4$ α-olefin, that has a density from 0.915 g/cc to 0.925 g/cc and contains long chain branching with broad MWD. LDPE is typically produced by way of high pressure free radical polymerization (tubular reactor or autoclave with free radical initiator). Nonlimiting examples of LDPE include MarFlex™ (Chevron Phillips), LUPOLEN™ (LyondellBasell), as well as LDPE products from Borealis, Ineos, ExxonMobil, and others.

Medium density polyethylene (or "MDPE") is an ethylene homopolymer, or an ethylene/α-olefin copolymer comprising at least one $C_3$-$C_{10}$ α-olefin, or a $C_3$-$C_4$ α-olefin, that has a density from 0.926 g/cc to 0.940 g/cc.

Melt index (I2) is measured at 190° C. under a load of 2.16 kg according to ASTM D1238.

Melt index (I0.5) is measured at 190° C. under a load of 0.5 kg according to ASTM D 1238.

Melt index (I10) is measured at 190° C. under a load of 10.0 kg according to ASTM D-1238.

Melt index (I21) is measured at 190° C. under a load of 21.0 kg according to ASTM D 1238.

Melt index I21/I2 or "I21/I2 ratio." The ratio I21/I2 is an indirect measure of the viscosity ratio at high shear rates and low shear rates and is indicative of shear thinning behavior which is related to both molecular weight distribution (MWD) as well as the presence of long chain branching, each of which significantly affect processability. In general, polyethylene containing long chain branching possesses high melt strength and exhibits low viscosity under high shear rate conditions, permitting high processing rates compared to polyethylene with little, or no, long chain branching.

"Multi-component ethylene-based copolymer" (or "EPE") comprises units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer, such as described in patent references U.S. Pat. Nos. 6,111,023; 5,677,383; and 6,984,695. EPE resins have a density from 0.905 g/cc, or 0.908 g/cc, or 0.912 g/cc, or 0.920 g/cc to 0.926 g/cc, or 0.929 g/cc, or 0.940 g/cc, or 0.962 g/cc. Nonlimiting examples of EPE resins include ELITE™ enhanced polyethylene (available from The Dow Chemical Company), ELITE AT™ advanced technology resins (available from The Dow Chemical Company), SURPASS™ Polyethylene (PE) Resins (available from Nova Chemicals), and SMART™ (available from SK Chemicals Co.).

A "multimodal ethylene copolymer" is an ethylene/$C_4$-$C_{10}$ α-olefin copolymer that has at least two distinct peaks in a GPC showing the molecular weight distribution. Multimodal includes copolymer having two peaks (bimodal) as well as copolymer having more than two peaks. Nonlimiting examples of HDPE include DOW™ High Density Polyethylene (HDPE) Resins (available from The Dow Chemical Company), ELITE™ Enhanced Polyethylene Resins (available from The Dow Chemical Company), CONTINUUM™ Bimodal Polyethylene Resins (available from The Dow Chemical Company), LUPOLEN™ (available from LyondellBasell), as well as HDPE products from Borealis, Ineos, and ExxonMobil.

An "olefin-based polymer," as used herein is a polymer that contains more than 50 mole percent polymerized olefin monomer (based on total amount of polymerizable monomers), and optionally, may contain at least one comonomer. Nonlimiting examples of olefin-based polymer include ethylene-based polymer and propylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "propylene-based polymer" is a polymer that contains more than 50 mole percent polymerized propylene monomer (based on the total amount of polymerizable monomers) and, optionally, may contain at least one comonomer "Single-site catalyzed linear low density polyethylenes" (or "m-LLDPE") are linear ethylene/α-olefin copolymers containing homogeneous short-chain branching distribution comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. m-LLDPE has density from 0.913 g/cc, or 0.918 g/cc, or 0.920 g/cc to 0.925 g/cc, or 0.940 g/cc. Nonlimiting examples of m-LLDPE include EXCEED™ metallocene PE (available from ExxonMobil Chemical), LUFLEXEN™ m-LLDPE (available from LyondellBasell), and ELTEX™ PF m-LLDPE (available from Ineos Olefins & Polymers).

Surface smoothness. The surface smoothness of a conductor jacket is measured according to ANSI 1995 via a Surftest SV-400 Series 178 Surface Texture Measuring Instrument. A wire sample is placed in a V-Block and the stylus (10 urn) is lowered down to a specific start position (about 1 gram force is applied to wire). At a fixed rate of 2 (millimeter per second) the stylus is moved in the transverse direction taking measurements. Four readings per wire sample and four samples are tested which are then averaged with values reported in µ-inch.

Tensile properties. The present compositions can be characterized by their tensile strength at break (in megapascals, MPa) and elongation at break (%) ("TE"). Tensile strength ("TS") and elongation at break are measured in accordance with the ASTM D638 testing procedure on compression molded samples prepared according to ASTM D4703. Elongation at break, or elongation to break, is the strain on a sample when it breaks, expressed as a percent.

Tm or "melting point" as used herein (also referred to as a melting peak in reference to the shape of the plotted DSC curve) measured by the DSC (Differential Scanning calorimetry) technique for measuring the melting points or peaks of polyolefins as described in U.S. Pat. No. 5,783,638. It should be noted that many blends comprising two or more polyolefins will have more than one melting point or peak, many individual polyolefins will comprise only one melting point or peak.

"Ultra low density polyethylene" (or "ULDPE") and "very low density polyethylene" (or "VLDPE") each is a linear ethylene/α-olefin copolymer containing heterogeneous short-chain branching distribution comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. ULDPE and VLDPE each has a density from 0.885 g/cc, or 0.90 g/cc to 0.915 g/cc. Nonlimiting examples of ULDPE and VLDPE include ATTANE™ ultra low density polyethylene resins (available form The Dow Chemical Company) and FLEXOMER™ very low density polyethylene resins (available from The Dow Chemical Company).

DETAILED DESCRIPTION

The present disclosure provides a process for producing a conductor jacket. In an embodiment, the process includes blending a broad molecular weight distribution (MWD) ethylene-based polymer having an I21/I2 ratio from 55 to 85 with a narrow MWD ethylene-based polymer having an I21/I2 ratio from 20 to 50. The process includes forming a blend component comprising from 20 wt % to 45 wt % of the broad MWD ethylene-based polymer, from 80 wt % to 55 wt % of the narrow MWD ethylene-based polymer, and optional carbon black. The blend component has a density from 0.925 g/cc to 0.955 g/cc and an I21/I2 ratio from 30 to 55. The process includes extruding the blend component over a conductor at a rate greater than 1.02 meters per second (m/s) (i.e., 200 feet/minute (ft/min)). The process includes forming a conductor jacket having a surface smoothness from 30 µ-inch to 80 µ-inch.

The present disclosure provides another process for producing a conductor jacket. In an embodiment, the process includes blending a broad molecular weight distribution (MWD) ethylene-based polymer having an I21/I2 ratio from 55 to 85 with a narrow MWD ethylene-based polymer having an I21/I2 ratio from 20 to 50. The process includes forming a blend component comprising from 20 wt % to 70 wt % of the broad MWD ethylene-based polymer, from 80 wt % to 20 wt % of the narrow MWD ethylene-based polymer, and optionally from 0 wt % to 10 wt % carbon black. The blend component has a density from 0.925 g/cc to 0.955 g/cc and an I21/I2 ratio from 15 to 65. The process includes extruding the blend component over a conductor at a rate greater than 1.02 meters per second (m/s) (i.e., 200 feet/minute (ft/min)). The process includes forming a conductor jacket having a surface smoothness from 20 µ-inch to 80 µ-inch.

1. Broad and Narrow MWD Ethylene-Based Polymer.

The process includes blending a broad MWD ethylene-based polymer with a narrow MWD ethylene-based polymer. A "broad molecular weight distribution ethylene-based polymer," or a "broad MWD ethylene-based polymer" is an ethylene-based polymer having an I21/I2 ratio from 55 to 85. A "narrow molecular weight distribution ethylene-based polymer," or "narrow MWD ethylene-based polymer" is an ethylene-based polymer having an I21/I2 ratio from 20 to 50.

The ethylene-based polymer can be an ethylene homopolymer or an ethylene/α-olefin copolymer. Nonlimiting examples of suitable α-olefin comonomers for the ethylene-based polymer include $C_3$-$C_{20}$ α-olefin, or $C_4$-$C_{12}$ α-olefin, or $C_4$-$C_8$ α-olefin. Further nonlimiting examples of suitable α-olefin comonomer include propylene, butene, methyl-1-pentene, hexene, octene, decene, dodecene, tetradecene, hexadecene, octadecene, cyclohexyl-1-propene (allyl cyclohexane), vinyl cyclohexane, and combinations thereof. In an embodiment the α-olefin comonomer for the ethylene-based polymer is selected from butene, hexene, or octene.

In an embodiment, the broad MWD ethylene-based polymer is an ethylene/$C_4$-$C_8$ α-olefin copolymer having one, some, or all of the following properties:

(i) a density from 0.915 g/cc, or 0.920 g/cc, or 0.925 g/cc, or 0.930 g/cc, or 0.933 g/cc to 0.935 g/cc, or 0.937 g/cc; and/or (ii) an I2 from 0.5 g/10 min, or 0.6 g/10, or 0.65 g/10 min, or 0.7 g/10 min to 0.8 g/10 min, or 0.9 g/10 min; and/or (iii) an I21 from 35 g/10 min, or 40 g/10 min, or 45 g/10 min, or 50 g/10 min to 55 g/10 min, or 60 g/10 min, or 65 g/10 min, or 70 g/10 min, or 75 g/10 min; and/or (iv) an I21/I2 ratio from 55, or 60, or 65 to 70, or 75, or 80, or 85.

In an embodiment, the broad MWD ethylene-based polymer is an ethylene/$C_4$-$C_8$ α-olefin copolymer that is a medium density polyethylene or "broad MWD MDPE." The broad MDPE has one, some, or all of the following properties:

(i) a density from 0.933 g/cc, or 0.935 g/cc, to 0.937 g/cc; and/or (ii) an I2 from 0.5 g/10 min, or 0.65 g/10 min, or 0.8 g/10 min to 1.0 g/10 min, or 1.5 g/10 min; and/or (iii) an I21 from 45 g/10 min, or 49 g/10 min, or 50 g/10 min to 52 g/10 min, or 54 g/10 min, or 55 g/10 min; and/or (iv) an I21/I2 from 60, or 65, or 70 to 75, or 80.

In an embodiment, the broad MWD ethylene-based polymer is an ethylene/$C_4$-$C_8$ α-olefin copolymer that is a linear low density polyethylene or "broad MWD LLDPE." The broad LLDPE has one, some, or all of the following properties:

(i) a density from 0.915 g/cc, or 0.920 g/cc to 0.925 g/cc; and/or (ii) an I2 from 0.5 g/10 min, or 0.65 g/10 min, or 0.8 g/10 min to 1.0 g/10 min, or 1.5 g/10 min; and/or (iii) an I21 from 45 g/10 min, or 49 g/10 min, or 50 g/10 min to 52 g/10 min, or 54 g/10 min, or 55 g/10 min; and/or (iv) an I21/I2 from 60, or 65, or 70 to 75, or 80.

In an embodiment, the narrow MWD ethylene-based polymer is an ethylene/$C_4$-$C_8$ α-olefin copolymer that is a linear low density polyethylene or "narrow MWD LLDPE." The narrow MWD LLDPE has one, some, or all of the following properties:

(i) a density from 0.915 g/cc, or 0.917 g/cc, or 0.918 g/cc to 0.919 g/cc;

(ii) an I2 from 0.5 g/10 min, or 0.9 g/10 min, 1.0 g/10 min, or 1.5 g/10 min, or 2.0 g/10 min to 2.3 g/10 min, or 2.5 g/10 min, or 2.9 g/10 min, or 3.0 g/10 min; and/or (iii) an I21 from 35 g/10 min or 40 g/10 min, or 50 g/10 min, or 60 g/10 min, or 61 g/10 min to 70 g/10 min, or 71 g/10 min, or 80 g/10 min, or 85 g/10 min, or 87 g/10 min, or 90 g/10 min; and/or (iv) an I21/I2 ratio from 20, or 25, or 27, or 30, or 31 to 35, or 39, or 40, or 45, or 50.

In an embodiment, the narrow MWD ethylene-based polymer is an ethylene/$C_4$-$C_8$ α-olefin copolymer that is a medium density polyethylene or "MDPE." The narrow MWD MDPE has one, some, or all of the following properties:

(i) a density from 0.933 g/cc, or 0.935 g/cc to 0.937 g/cc; and/or (ii) an I2 from 2.2 g/10 min, or 2.3 g/10 min, or 2.5 g/10 min to 2.8 g/10 min; and/or (iii) an I21 from 30 g/10 min, or 33 g/10 min to 35 g/10 min, or 37 g/10 min, or 40 g/10 min; and/or (iv) an I21/I2 ratio from 25, or 27, or 28, or 30.

2. Blend Component

The process includes blending the broad MWD ethylene-based polymer and the narrow MWD ethylene-based polymer to form a blend component. In an embodiment, the blending occurs by way of melt blending. "Melt blending" is a process whereby at least two components are combined or otherwise mixed together, and at least one of the components is in a melted state. The melt blending may be accomplished by way of batch mixing, extrusion blending, extrusion molding, and any combination thereof.

In an embodiment, the blend component includes from 20 wt %, or 25 wt %, or 30 wt % to 30 wt %, or 35 wt %, or 40 wt %, or 45 wt % of the broad MWD ethylene-based polymer and from 80 wt %, or 75 wt %, or 79 wt % to 65 wt %, or 60 wt %, or 55 wt % of the narrow MWD ethylene-based polymer. The blend component also includes from 1 wt %, or 2 wt %, or 3 wt %, or 5 wt % to 7 wt %, or 9 wt %, or 10 wt % carbon black. A nonlimiting example of a suitable carbon black is DFNA-0037 BK. The blend component has a density from 0.925 g/cc, or 0.930 g/cc, or 0.935 g/cc, or 0.940 g/cc to 0.945 g/cc, or 0.950 g/cc, or 0.955 g/cc; and an I21/I2 ratio from 30, or 32, or 34, or 36, or 38, or 40, or 42, or 45 to 46, or 48, or 50, or 52, or 55.

In another embodiment, the blend component includes from 20 wt %, or 25 wt %, or 30 wt %, or 30 wt %, or 35 wt %, or 40 wt %, or 45 wt % to 50 wt %, or 55 wt %, or 60 wt %, or 65 wt %, or 70 wt % of the broad MWD ethylene-based polymer and from 80 wt %, or 75 wt %, or 79 wt %, or 65 wt %, or 60 wt %, or 55 wt %, or 50 wt %, or 49%, or 45 wt % to 40 wt %, or 35 wt %, or 30 wt %, or 25 wt %, or 20 wt % of the narrow MWD ethylene-based polymer. The blend component has a density from 0.925 g/cc, or 0.930 g/cc, or 0.933 g/cc, or 0.935 g/cc, or 0.940 g/cc to 0.945 g/cc, or 0.948 g/cc, or 0.950 g/cc, or 0.955 g/cc; and an I21/I2 ratio from 15, or 17, or 20, or 30, or 32, or 34, or 36, or 38, or 40, or 45 to 50, or 52, or 55, or 60, or 62, or 65.

In another embodiment, the blend component includes from 20 wt %, or 25 wt %, or 30 wt %, or 30 wt %, or 35 wt %, or 40 wt %, or 45 wt % to 50 wt %, or 55 wt %, or 60 wt %, or 65 wt %, or 70 wt % of the broad MWD ethylene-based polymer; from 80 wt %, or 75 wt %, or 79 wt %, or 65 wt %, or 60 wt %, or 55 wt %, or 50 wt %, or 49%, or 45 wt % to 40 wt %, or 35 wt %, or 30 wt %, or 25 wt %, or 20 wt % of the narrow MWD ethylene-based polymer; and from 1 wt %, or 2 wt %, or 3 wt %, or 5 wt % to 7 wt %, or 9 wt %, or 10 wt % carbon black. It is understood that individual weight percentages for the broad MWD ethylene-based polymer, the narrow MWD ethylene-based polymer, and the carbon black amount to 100 wt % of the blend component (with optional additives). The blend component has a density from 0.925 g/cc, or 0.930 g/cc, or 0.933 g/cc, or 0.935 g/cc, or 0.940 g/cc to 0.945 g/cc, or 0.948 g/cc, or 0.950 g/cc, or 0.955 g/cc; and an I21/I2 ratio from 15, or 17, or 20, or 30, or 32, or 34, or 36, or 38, or 40, or 45 to 50, or 52, or 55, or 60, or 62, or 65.

The blend component may include one or more optional additives. Nonlimiting examples of suitable additives include antioxidants, colorants, ultra violet (UV) absorbers or stabilizers, anti-blocking agents, flame retardants, compatibilizers, plasticizers, fillers, processing aids, and combinations thereof.

In an embodiment, the blend component includes an antioxidant. Nonlimiting examples of suitable antioxidants include phenolic antioxidants, thio-based antioxidants, phosphate-based antioxidants, and hydrazine-based metal deactivators. In a further embodiment, the blend component includes an antioxidant, such as IRGANOX 1035, present in an amount from 0.1 wt %, or 0.2 wt % to 0.3 wt % based on the total weight of the blend component.

In an embodiment, the blend component includes a filler. Nonlimiting examples of suitable fillers include zinc oxide, zinc borate, zinc molybdate, zinc sulfide, organo-clay, and combinations thereof. The filler may or may not have flame retardant properties.

In an embodiment, the blend component includes a processing aid. Nonlimiting examples of suitable processing aids include oils, organic acids (such as stearic acid), and metal salts of organic acids (such as zinc stearate). In a further embodiment, the blend component includes a processing aid, such as DYNAMAR FX 5912, present in an amount from 0.01 wt %, or 0.05 wt %, or 0.1 wt % to 0.15 wt %, or 0.17 wt %, or 0.2 wt %, based on total weight of the blend component.

In an embodiment, the blend component includes from 20 wt % to 45 wt % of the broad MWD ethylene-based polymer, from 80 wt % to 55 wt % of the narrow MWD ethylene-based polymer, and from 1 wt % to 10 wt % carbon black; the broad MWD ethylene-based polymer, the narrow ethylene-based polymer and the carbon black amounting to 100 wt % of the blend component (with optional additives). The blend component has a density from 0.925 g/cc, or 0.930 g/cc, or 0.935 g/cc to 0.940 g/cc, or 0.950 g/cc, or 0.955 g/cc and an I21/I2 ratio from 30, or 34 to 37, or 40, or 43, or 45 to 47, or 49, or 50, or 52, or 55.

In an embodiment, the blend component includes from 20 wt % to 45 wt %, or 55 wt %, or 70 wt % of the broad MWD ethylene-based polymer, from 80 wt % to 55 wt %, or 49 wt %, or 45 wt %, or 30 wt %, or 25 wt %, or 20 wt % of the narrow MWD ethylene-based polymer, and from 0 wt %, or 1 wt % to 10 wt % carbon black; the broad MWD ethylene-based polymer, the narrow ethylene-based polymer and the carbon black amounting to 100 wt % of the blend component (with optional additives). The blend component has a density from 0.925 g/cc, or 0.930 g/cc, or 0.933 g/cc, or 0.935 g/cc, or 0.940 g/cc to 0.945 g/cc, or 0.948 g/cc, or 0.950 g/cc, or 0.955 g/cc; and an I21/I2 ratio from 15, or 17, or 20, or 30, or 32, or 34, or 36, or 38, or 40, or 45 to 50, or 52, or 55, or 60, or 62, or 65.

In an embodiment, the blend component is void of, or is otherwise free of, propylene.

In an embodiment, the blend component is void of, or is otherwise free of, high density polyethylene, or "HDPE."

3. Extrusion

The process includes extruding the blend component over a conductor at a rate greater than 1.02 meters per second (m/s) (200 feet per minute (ft/min), and forming a conductor jacket having a surface smoothness from 25 μ-inch, or 30 μ-inch, or 35 μ-inch, or 40 μ-inch, or 50 μ-inch to 60 μ-inch, or 70 μ-inch 80 μ-inch.

The extrusion step is performed by an extruder. The extruder has a crosshead die, which provides the desired layer (wall or coating) thickness. A nonlimiting example of an extruder, which can be used is the single screw type modified with a crosshead die, cooling through and continuous take-up equipment. A typical single screw type extruder can be described as one having a hopper at its upstream end and a die at its downstream end. The hopper feeds into the barrel, which contains a screw. At the downstream end, between the end of the screw and the die is a screen pack and a breaker plate. The screw portion of the extruder is considered to be divided up into three sections, the feed section, the compression section, and the metering section, and multiple heating zones from the rear heating zone to the front heating zone with the multiple sections running from upstream to downstream. The length to diameter ratio of the barrel is in the range of 16:1 to 30:1. Grooved barrel extruders or twin screw extruders can also be employed in the core coating process. The jacketing extrusion process can take place at temperatures in the range from 160° C., or 180° C., or 200° C. to 220° C., or 240° C., or 260° C. The crosshead die distributes the blend component in a flow channel such that the melted blend component exits with a uniform velocity and is applied to the conductor. In this way, the blending (melt blending) and the extrusion are performed in the same, single extruder. The conductor passes through the center of the crosshead, and as it exits, a uniform layer of the blend component is circumferentially applied using either pressure, or semi-pressure of tube-on tooling. One or more layers of the blend component (or other material) can be applied using a multiple crosshead. The coated conductor is then cooled in a water trough sufficiently to prevent deformation of the applied blend component layer on the take-up reel, yielding a conductor jacket.

Melt blending may occur sequentially before the extrusion. Alternatively, melt blending may occur simultaneously, or substantially simultaneously with the extrusion (i.e., melt blending and extrusion occurring in the same extruder). The carbon black may be added during the melt blending and/or during the extrusion.

The extrusion rate is greater than 1.02 m/s (>200 ft/min). In an embodiment, the extrusion rate is from greater than 1.02 m/s, or 1.14 m/s, or 1.27 m/s, or 1.40 m/s, to 1.52 m/s, or 1.65 m/s.

The process includes forming a conductor jacket. The conductor jacket is composed of the blend component. The conductor jacket has a surface smoothness from 25 μ-inch, or 30 μ-inch, or 35 μ-inch, or 40 μ-inch, or 50 μ-inch to 60 μ-inch, or 70 μ-inch 80 μ-inch.

In an embodiment, the cable jacket composed of the blend component has a thickness from 0.508 mm, or 0.762 mm, or 1.016 mm, or 1.27 mm to 1.524 mm, or 1.778 mm, or 2.032 mm, or 2.286 mm, or 2.54 mm and the extrusion rate is from greater than 1.02 m/s, or 1.14 m/s, or 1.27 m/s to 1.40 m/s, or 1.52 m/s, or 1.65 m/s. In a further embodiment, the conductor jacket is void of propylene-based polymer and/or HDPE.

In an embodiment, the process includes blending a broad MWD linear low density polyethylene (LLDPE) having a density from 0.915 g/cc, or 0.920 g/cc to 0.925 g/cc and an I21/I2 ratio from 73, or 75 to 77 with a narrow MWD LLDPE having a density from 0.915 g/cc, or 0.920 g/cc to 0.924 g/cc and an I21/I2 ratio from 30, or 33 to 35. The process includes forming a blend component comprising from 20 wt %, or 25 wt %, or 30 wt %, or 35 wt % to 40 wt %, or 45 wt % of the broad MWD LLDPE, from 70 wt %, or 65 wt %, or 60 wt % to 55 wt %, or 50 wt % of the narrow MWD LLDPE, and from 1 wt %, or 2 wt %, or 3 wt %, or 4 wt % to 5 wt %, or 6 wt %, or 7 wt % carbon black. The blend component has a density from 0.925 g/cc, or 0.930 g/cc to less than 0.935 g/cc and an I21/I2 ratio from 30, or 35, or 40, or 45 to 50, or 55. The process includes extruding the blend component over the conductor at a rate greater than 1.02 m/s (or at 1.52 m/s) and forming a conductor jacket having a surface smoothness from 30 μ-inch, or 40 μ-inch, or 50 μ-inch to 60 μ-inch, or 70 μ-inch, or 80 μ-inch.

In an embodiment, the process includes blending a broad MWD linear low density polyethylene (LLDPE) having a density from 0.915 g/cc, or 0.920 g/cc to 0.925 g/cc and an I21/I2 ratio from 73, or 75 to 77 with a narrow MWD LLDPE having a density from 0.915 g/cc, or 0.920 g/cc to 0.924 g/cc and an I21/I2 ratio from 20, or 24, or 30, or 33 to 35. The process includes forming a blend component comprising from 20 wt %, or 25 wt %, or 30 wt %, or 35 wt % to 40 wt %, or 45 wt %, or 50 wt %, or 55 wt %, or 60 wt %, or 65 wt %, or 70 wt % of the broad MWD LLDPE, from 70 wt %, or 65 wt %, or 60 wt % to 55 wt %, or 50 wt %, or 49 wt %, or 45 wt %, or 40 wt %, or 35 wt %, or 30 wt %, or 25 wt %, or 20 wt % of the narrow MWD LLDPE, and from 1 wt %, or 2 wt %, or 3 wt %, or 4 wt % to 5 wt %, or 6 wt %, or 7 wt % carbon black. The blend component has a density from 0.925 g/cc, or 0.930 g/cc, or 0.933 g/cc to 0.935 g/cc, or 0.940 g/cc, or 0.945 g/cc, or 0.948 g/cc, or 0.950 g/cc, or 0.955 g/cc; and an I21/I2 ratio from 30, or 32, or 34, or 36, or 38, or 40, or 45 to 50, or 52, or 55, or 60, or 62, or 65. The process includes extruding the blend component over the conductor at a rate greater than 1.02 m/s (or at 1.52 m/s) and forming a conductor jacket having a surface smoothness from 30 μ-inch, or 40 μ-inch, or 50 μ-inch to 60 μ-inch, or 70 μ-inch, or 80 μ-inch.

In an embodiment, the process includes blending a broad MWD linear low density polyethylene (LLDPE) having a density from 0.915 g/cc, or 0.920 g/cc to 0.925 g/cc and an I21/I2 ratio from 73, or 75 to 77 with a narrow MWD LLDPE having a density from 0.915 g/cc, or 0.917 g/cc to 0.920 g/cc and an I21/I2 ratio from 30, or 31 to 33. The process includes forming a blend component comprising from 23 wt %, or 25 wt %, or 30 wt %, or 35 wt % to 40 wt %, or 45 wt % of the broad MWD LLDPE, from 70 wt %, or 65 wt %, or 60 wt % to 55 wt %, or 50 wt % of the narrow MWD LLDPE and from 1 wt %, or 2 wt %, or 3 wt %, or 4 wt % to 5 wt %, or 6 wt %, or 7 wt % carbon black. The blend component has a density from 0.925 g/cc, or 0.930 g/cc to less than 0.935 g/cc and an I21/I2 ratio from 33, or 35, or 37 to 39, or 40, or 42. The process includes extruding the blend component over the conductor at a rate greater than 1.02 m/s (or at 1.52 m/s), and forming a conductor jacket having a surface smoothness from 45 μ-inch, or 50 μ-inch, or 55 μ-inch, or 60 μ-inch, or 65 μ-inch to 70 μ-inch, or 75 μ-inch, or 80 μ-inch (hereafter Process A).

In an embodiment, Process A includes forming a conductor jacket having a tensile strength from 20.0 MPa, or 21 MPa to 22.0 MPa and a tensile elongation from 825%, or 850%, or 870% to 900%, or 910%.

In an embodiment, the process includes blending a broad MWD linear low density polyethylene (LLDPE) having a density from 0.915 g/cc, or 0.920 g/cc to 0.925 g/cc and an I21/I2 ratio from 73, or 75 to 77 with a narrow MWD LLDPE having a density from 0.915 g/cc, or 0.917 g/cc to 0.920 g/cc and an I21/I2 ratio from 30, or 31 to 33. The process includes forming a blend component comprising from 23 wt %, or 25 wt %, or 30 wt %, or 35 wt % to 40 wt %, or 45 wt % of the broad MWD LLDPE, from 70 wt %, or 65 wt %, or 60 wt % to 55 wt %, or 50 wt % of the narrow MWD LLDPE, and from 1 wt %, or 2 wt %, or 3 wt %, or 4 wt % to 5 wt %, or 6 wt %, or 7 wt % carbon black. The blend component has a density from 0.925 g/cc, or 0.930 g/cc to less than 0.935 g/cc and an I21/I2 from 35, or 40, or 45 to 50, or 55. The process includes extruding the blend component over the conductor at a rate greater than 1.02 m/s (or at 1.52 m/s), and forming a conductor jacket having a surface smoothness from 35 μ-inch, or 40 μ-inch to 45 μ-inch, or 50 μ-inch (hereafter Process B).

In an embodiment, Process B includes forming a conductor jacket having a tensile strength from 19.0 MPa, or 20.0 MPa to 21.0 MPa, or 23.0 MPa and a tensile elongation from 780% or 800% to 820%, or 850%, or 870%.

In an embodiment, the process includes blending a broad MWD medium density polyethylene (MDPE) having a density from 0.933 g/cc, or 0.935 g/cc to less than 0.937 g/cc and an I21/I2 from 55, or 60, or 65 to 70, or 75 with a narrow MWD ethylene-based polymer having a density from 0.920 g/cc, or 0.925 g/cc to 0.930 g/cc, or 0.935 g/cc and an I21/I2 ratio from 25, or 30 to 35, or 40. The process includes forming a blend component comprising from 35 wt %, or 40 wt % to 50 wt %, or 55 wt % of the broad MWD MDPE, from 50 wt %, or 45 wt % to 40 wt % of the narrow MWD ethylene-based polymer, and from 1 wt %, or 2 wt %, or 3 wt %, or 4 wt % to 5 wt %, or 6 wt %, or 7 wt % carbon black. The blend component has a density from 0.935 g/cc, or 0.940 g/cc to less than 0.945 g/cc and an I21/I2 from 35, or 40 to 50, or 55. The process includes extruding the blend component over the conductor at a rate greater than 1.02 m/s (or at 1.52 m/s), and forming a conductor jacket having a surface smoothness from 40 μ-inch, or 45 μ-inch, or 50 μ-inch to 55 μ-inch, or 60 μ-inch (hereafter Process C).

In an embodiment, Process C includes forming a conductor jacket having a tensile strength from 27 MPa, or 29 MPa to 30 MPa and a tensile elongation from 830%, or 850%, or 880%, 900% to 920%, or 950%, or 970%.

In an embodiment, the process includes blending a broad MWD medium density polyethylene (MDPE) having a density from 0.933 g/cc, or 0.935 g/cc to 0.937 g/cc and an I21/I2 from 63, or 65 to 67 with a narrow MWD MDPE having a density from 0.933 g/cc, or 0.935 g/cc to 0.937 g/cc and an I21/I2 ratio from 25, or 27 to 30. The process includes forming a blend component comprising from 35 wt %, or 40 wt % to 45 wt %, or 50 wt % of the broad MWD MDPE, from 65 wt %, or 60 wt %, or 55 wt % to 50 wt %, or 45 wt % of the narrow MDPE, and from 1 wt %, or 2 wt %, or 3 wt %, or 4 wt % to 5 wt %, or 6 wt %, or 7 wt % carbon black. The blend component has a density from 0.935 g/cc, or 0.937 g/cc, or 0.940 g/cc to less than 0.945 g/cc and an I21/I2 from 40, or 43 to 45. The process includes extruding the blend component over the conductor at a rate greater than 1.02 m/s (or at 1.52 m/s), and forming a conductor jacket having a surface smoothness from 50 μ-inch, or 55 μ-inch to 60 μ-inch (hereafter Process D).

In an embodiment, Process D includes forming a conductor jacket having a tensile strength from 27 MPa, or 29 MPa to 30 MPa and a tensile elongation from 860%, or 880%, or 900% to 920%, or 950%, or 970%.

In an embodiment, the process includes blending a broad MWD linear low density polyethylene (LLDPE) having a density from 0.915 g/cc, or 0.920 g/cc to 0.925 g/cc and an I21/I2 ratio from 73, or 75 to 77 with a narrow MWD LLDPE having a density from 0.915 g/cc, or 0.917 g/cc to 0.920 g/cc and an I21/I2 ratio from 20, or 24 to 25, or 30, or 35. The process includes forming a blend component comprising from 30 wt %, or 35 wt %, or 40 wt %, or 45 wt %, or 50 wt %, or 55 wt % to 60 wt %, or 65 wt %, or 70 wt % of the broad MWD LLDPE, from 70 wt %, or 65 wt %, or 60 wt %, or 55 wt %, or 50 wt %, or 49 wt %, or 45 wt % to 40 wt %, or 35 wt %, or 30 wt %, or 25 wt %, or 20 wt % of the narrow MWD LLDPE and from 1 wt %, or 2 wt %, or 3 wt %, or 4 wt % to 5 wt %, or 6 wt %, or 7 wt % carbon black. The blend component has a density from 0.925 g/cc, or 0.930 g/cc to 0.933 g/cc, or 0.934 g/cc and an I21/I2 ratio from 35, or 40, or 43 to 58, or 60, or 65. The process includes extruding the blend component over the conductor at a rate greater than 1.02 m/s (or at 1.52 m/s), and forming a conductor jacket having a surface smoothness from 45 µ-inch, or 50 µ-inch, or 55 µ-inch, or 60 µ-inch, or 65 µ-inch to 70 µ-inch, or 75 µ-inch, or 80 µ-inch (hereafter Process E).

In an embodiment, Process E includes forming a conductor jacket having a tensile strength from 15.0 MPa, or 16.0 MPa, or 16.2 MPa to 18.0 MPa, or 20.0 MPa, or 25.0 MPa and a tensile elongation from 625%, or 650%, or 651% to 665%, or 670%, or 680%, or 700%.

In an embodiment, the process includes blending a broad MWD medium density polyethylene (MDPE) having a density from 0.933 g/cc, or 0.935 g/cc to 0.937 g/cc and an I21/I2 from 63, or 65 to 67 with a narrow MWD MDPE having a density from 0.933 g/cc, or 0.935 g/cc to 0.937 g/cc and an I21/I2 ratio from 25, or 27 to 30. The process includes forming a blend component comprising from 35 wt %, or 40 wt %, or 45 wt, or 50 wt % to 55 wt %, or 60 wt %, or 65 wt %, or 70 wt % of the broad MWD MDPE, from 65 wt %, or 60 wt %, or 55 wt %, or 50 wt % or 49 wt % to 45 wt %, or 40 wt %, or 35 wt %, or 30 wt %, or 25 wt %, or 20 wt % of the narrow MDPE, and from 1 wt %, or 2 wt %, or 3 wt %, or 4 wt % to 5 wt %, or 6 wt %, or 7 wt % carbon black. The blend component has a density from 0.935 g/cc, or 0.937 g/cc, or 0.940 g/cc to 0.945 g/cc, or 0.950 g/cc and an I21/I2 from 15, or 17, to 18, or 20, or 25, or 30, or 35. The process includes extruding the blend component over the conductor at a rate greater than 1.02 m/s (or at 1.52 m/s), and forming a conductor jacket having a surface smoothness from 20 µ-inch, or 25 µ-inch to 30 µ-inch, or 40 µ-inch (hereafter Process F).

In an embodiment, Process F includes forming a conductor jacket having a tensile strength from 25 MPa, or 26 MPa, or 27 MPa, or 29 MPa to 30 MPa and a tensile elongation from 800%, or 807% to 810%, or 820%, or 860%, or 880%, or 900%.

In an embodiment, the process includes blending a broad MWD medium density polyethylene (MDPE) having a density from 0.933 g/cc, or 0.935 g/cc to 0.937 g/cc and an I21/I2 from 63, or 65 to 67 with a narrow MWD LLDPE having a density from 0.915 g/cc, or 0.917 g/cc to 0.920 g/cc, or 0.921 g/cc, or 0.925 g/cc and an I21/I2 ratio from 30, or 31 to 33, or 39, or 40. The process includes forming a blend component comprising from 35 wt %, or 40 wt %, or 45 wt, or 50 wt % to 55 wt %, or 60 wt %, or 65 wt %, or 70 wt % of the broad MWD MDPE, from 65 wt %, or 60 wt %, or 55 wt %, or 50 wt %, or 49 wt % to 45 wt %, or 40 wt %, or 35 wt %, or 30 wt %, or 25 wt %, or 20 wt % of the narrow LLDPE, and from 1 wt %, or 2 wt %, or 3 wt %, or 4 wt % to 5 wt %, or 6 wt %, or 7 wt % carbon black. The blend component has a density from 0.935 g/cc, or 0.937 g/cc, or 0.940 g/cc to 0.945 g/cc, 0.948 g/cc, or 0.950 g/cc and an I21/I2 from 30, or 40, or 50, or 55, or 60 to 62, or 65. The process includes extruding the blend component over the conductor at a rate greater than 1.02 m/s (or at 1.52 m/s), and forming a conductor jacket having a surface smoothness from 20 µ-inch, or 25 µ-inch to 30 µ-inch, or 40 µ-inch (hereafter Process G).

In an embodiment, Process G includes forming a conductor jacket having a tensile strength from 25 MPa, or 26 MPa, or 27 MPa, or 29 MPa to 30 MPa and a tensile elongation from 800%, or 805% to 810%, or 820%, or 860%, or 880%, or 900%.

The present process utilizing the two-polymer blend component advantageously provides improved processability (namely, the ability to extrude at line speeds greater than 1.02 m/s), while simultaneously achieving acceptable surface smoothness (30-80 µ-inch) for conductor jacketing while improving tensile strength and tensile elongation for the jacket.

The surface smoothness of 20-80 µ-inch provides aesthetic and customer satisfaction. The present process utilizing the two-polymer blend component minimizes diameter variations of the conductor jacket. The smoothness of 20-80 µ-inch, or 30-80 µ-inch minimizes the defects at the internal interfaces.

By way of example, and not by limitation, examples of the present disclosure are provided.

Examples

The materials used in the inventive examples and in the comparative samples are provided in Table 1A below.

TABLE 1A

| Material | Composition | Properties | | Source |
| --- | --- | --- | --- | --- |
| DFH-2065 (Component A) (broad MWD LLDPE) | LLDPE Ethylene/ octene copolymer | Density | 0.920 g/cc | The Dow ChemicalCompany |
| | | I2 | 0.65 | |
| | | I21 | 49 | |
| | | I21/I2 | 75 | |
| Dowlex 2247G (Component A1) (narrow MWD LLDPE) | LLDPE Ethylene/ octene copolymer | Density | 0.917 g/cc | The Dow Chemical Company |
| | | I2 | 2.3 | |
| | | I21 | 71 | |
| | | I21/I2 | 31 | |

TABLE 1A-continued

| Material | Composition | Properties | | Source |
|---|---|---|---|---|
| XUS60901 (Component A1) (narrow MWD LLDPE) | LLDPE Ethylene/ octene copolymer | Density $I2$ $I21$ $I21/I2$ | 0.919 g/cc 2.9 87 30 | The Dow Chemical Company |
| Dowlex GM 8480F (Component A1) (narrow MWD LLDPE) | LLDPE Ethylene/ octene copolymer | Density $I2$ $I21$ $I21/I2$ | 0.917 g/cc 3.0 74.82 24.9 | The Dow Chemical Company |
| DFH-3580 (Component B) (broad MWD MDPE) | MDPE Ethylene/ octene copolymer | Density $I2$ $I21$ $I21/I2$ | 0.935 g/cc 0.80 52 65 | The Dow Chemical Company |
| DFH-4580 (Component B) (broad MWD MDPE) | MDPE Ethylene/ octene copolymer | Density $I2$ $I21$ $I21/I2$ | 0.933-0.937 g/cc 0.7-0.9 38.5-67.5 55-75 | The Dow Chemical Company |
| Dowlex 2036G (Component B1) (narrow MWD MDPE) | MDPE Ethylene/ octene copolymer | Density $I2$ $I21$ $I21/I2$ | 0.935 g/cc 2.3 61 27 | The Dow Chemical Company |
| Dowlex 2645G (Component B1) (narrow MWD LLDPE) | LLDPE Ethylene/ octene copolymer | Density $I2$ $I21$ $I21/I2$ | 0.917-0.921 g/cc 0.8-1.0 35 39 | The Dow Chemical Company |
| Super Q | Additive | Density 1.09 g/cc | | Chemtura |
| DFNA-0037BK | carbon black masterbatch | Density 1.21 g/cc | | The Dow Chemical Company |
| Dynamar FX 5912 | Processing aid | Density 1.93 g/cc | | 3M |
| Irganox 1035 | Antioxidant additive | Density 1.072 g/cc | | BASF |

CS 1-9 and IE 1-12

Melt Blending Process

Banbury mixer/melt fed pelletizing extruder compounding line is used for the production of the blends for CS 1-9 and IE 1-12. The Banbury system typically provides very good control of the compounding temperature. A 3-stage mixing cycle with a 175° C. drop temperature is used.

Extrusion

Insulated wire extrusion trials CS 1-9 and IE 1-12 are completed on a 6.35 cm (2.5 in) Davis Standard wire line. The 6.35 cm Davis Standard wire and cable extruder is equipped with a 24:1 L/D barrel. The extruder is set up with a polyethylene type Maddox mixing head screw with a 3:1 compression ratio. The discharge from this extruder flows through a Guill type 9/32 in×5/8 in adjustable center crosshead and through the specified tubing tip and coating die to shape the melt flow for the sample extrusion. This equipment is used to generate samples with a final diameter of approximately 2.9 mm (0.114 in) and a wall thickness of approximately 0.635 mm (0.025 in) on a 14 American Wire Gauge (AWG) solid copper conductor (1.63 mm/0.064 in diameter).

CS10-15 and IE 13-16

Melt Blending Process

CS 10-15 and IE 13-16 are first mixed in a lab scale Brabender mixer before making wire samples. A brabender mixing bowl with 250 cc capacity and cam type mixing blades are used to melt mix the samples. The mixer temperature is set to 180° C. The mixing process involves first adding the resins into the mixing bowl at a mixing speed of 15 rotations-per-minute (rpm). Both heating zones are set at 180° C. After the resins begin to melt, the carbon black masterbatch (DFNA-0037BK), processing aid (Dynamar FX 5912), and antioxidants (Irganox 1035) are added and mixed at 50 rpm for 6 minutes. The molten material is then removed and placed between mylar sheets and pressed into a sheet using a Wabash compression molding press at room temperature (23° C.). A Berlyn pelletizer is used to pelletize the samples.

Mini-Wire Extrusion

Coated wire extrusion is performed on each of the materials using a Brabender Mini-Wire line on 14 gauge copper wire. The machine settings are shown in Table 1B. The equipment is used to generate samples with a final diameter of approximately 0.086 inches and a wall thickness of approximately 0.01 inches, on 14 AWG solid copper conductor of 1.63 mm (0.064 inch) diameter. After extrusion, surface smoothness is measured with a profilometer.

TABLE 1B

Mini-Wire Line Extrusion Parameters

| | |
|---|---|
| Heat Zones 1-4 | 210° C. |
| Screw RPM | 50 rpm |
| Line Speed | 46 ft/min |
| Melt Temperature | 224° C. |
| Die Size | 0.08 inches |
| Tubing Tip Size | 0.067 inches |
| Finished Diameter | 0.086 inches |
| Cooling Water Temperature | 35-40° C. |
| Wall Thickness | 0.01 inches |
| Screw (¾ inch diameter; 25:1 L/D) | General purpose polyethylene type, no mixing section |

Properties for comparative samples and inventive examples of conductor jackets are provided in Tables 2-4 below.

Qualitative smoothness is visually determined. In Tables 2-4, a qualitative smoothness of "++" indicates a very smooth wire surface. A qualitative smoothness of "--" indicates a very rough wire surface.

TABLE 2

Broad MWD LLDPE/Narrow MWD LLDPE Conductor Jackets

|  | CS-1 | IE-1 | IE-2 | IE-3 | IE-4 | IE-5 | CS-2 |
|---|---|---|---|---|---|---|---|
| Component A (DFH2065) | 93.93 | 23.93 | 33.93 | 23.9 | 33.9 | 43.9 | — |
| Component A1 (DOWLEX2247G) | — | 70 | 60 | 70 | 60 | 50 | 93.93 |
| Super Q | 0.2 | 0.2 | 0.2 | 0.2 | 0.2 | 0.2 | 0.2 |
| Component C (Irganox 1035) | 0.07 | 0.07 | 0.07 | 0.07 | 0.07 | 0.07 | 0.07 |
| Component D (Dynamar FX 5912) | 0.017 | 0.017 | 0.017 | 0.05 | 0.05 | 0.05 | 0.017 |
| Component E (DFNA-0037BK) | 5.78 | 5.78 | 5.78 | 5.78 | 5.78 | 5.78 | 5.78 |
| Density (g/cm$^3$) | 0.933 | 0.93 | 0.93 | 0.929 | 0.93 | 0.93 | 0.917 |
| MI2 (dg/min) | 0.8 | 1.9 | 1.7 | 1.9 | 1.7 | 1.5 | 2.4 |
| MI10 | 10.69 | 17.58 | 17.11 | 17.72 | 17.17 | 16.47 |  |
| MI0.5 | 0.10 | 0.40 | 0.34 | 0.38 | 0.34 | 0.28 |  |
| MI21 | 58.0 | 66.0 | 64.0 | 79.0 | 67.0 | 59.0 | 78.0 |
| MI21/MI2 | 72 | 34 | 37 | 41 | 39 | 39 | 32 |
| MI10/MI0.5 | 112 | 44 | 50 | 46 | 50 | 60 |  |
| TS (MPa) | 14.5 | 21.9 | 20.9 | 21.7 | 20.6 | 20 | 22.5 |
| % TS improvennent vs GP |  | 34 | 31 | 33 | 30 | 28 | 36 |
| TE (%) | 704 | 827 | 832 | 910 | 891 | 900 | 930 |
| % TE improvement vs GP |  | 15 | 15 | 23 | 21 | 22 | 24 |
| ESCR (10% Igepal solution at 50 C.; 125 mils) | >1500 | >1500 | >1500 | >1500 | >1500 | >1500 | >1500 |
| ESCR (10% Igepal solution at 50 C.; 125 mils) | >1500 | >1500 | >1500 | >1500 | >1500 | >1500 | >1500 |
| Smoothness (μ-inch) (wire extrusion at 1.52 m/s) | 26 | 79 | 67 | 73 | 58 | 46 | 639 |
| Qualitative Smoothness | ++ | ++ | ++ | ++ | ++ | ++ | -- |
| Pressure head (psi) | 1516 | 1520 | 1510 | 1523 | 1513 | 1514 | 1510 |
| Motor amps (A) | 38 | 40 | 39 | 39 | 38 | 38 | 38 |
| Melt temperature (° C.) | 212 | 213 | 213 | 213 | 213 | 213 | 213 |

CS—comparative sample
ESCR—environmental stress cracking resistance
GP—gas phase
IE—inventive example

TABLE 3

Broad MWD LLDPE/Narrow MWD LLDPE Conductor Jackets

|  | CS-3 | IE-6 | IE-7 | IE-8 | CS-4 | CS-10 | CS-11 | IE-13 | IE-16 |
|---|---|---|---|---|---|---|---|---|---|
| Component A (DFH2065) | 93.933 | 43.933 | 33.933 | 23.933 | — | 93.933 | — | 70 | 55.93 |
| Component A1 (XUS 60901.49) | — | 50 | 60 | 70 | 93.933 | — | — | — | — |
| Component A1 (Dowlex GM 8480F) | — | — | — | — | — | — | 93.933 | 23.93 | 38 |
| Super Q | 0.2 | 0.2 | 0.2 | 0.2 | 0.2 | 0.2 | 0.2 | 0.2 | 0.2 |
| Component C (Irganox 1035) | 0.07 | 0.07 | 0.07 | 0.07 | 0.07 | 0.07 | 0.07 | 0.07 | 0.07 |
| Component D (Dynamar FX 5912) | 0.017 | 0.017 | 0.017 | 0.017 | 0.017 | 0.017 | 0.017 | 0.017 | 0.017 |
| Component E (DFNA-0037BK) | 5.78 | 5.78 | 5.78 | 5.78 | 5.78 | 5.78 | 5.78 | 5.78 | 5.78 |
| Density (g/cm3) | 0.935 | 0.933 | 0.933 | 0.932 | 0.932 | 0.933 | 0.929 | 0.933 | 0.932 |
| MI2 (dg/min) | 0.7 | 1.5 | 1.9 | 2.2 | 3 | 0.6 | 3.2 | 1.1 | 1.5 |
| MI10 | 11.4 | 18.5 | 19.5 | 21.5 | 29.1 | 13.0 | 23.0 | 15.8 |  |
| MI0.5 | 0.10 | 0.30 | 0.36 | 0.45 | 0.55 | 4.90 | 15.10 | 0.17 |  |
| MI21 | 55.5 | 79.9 | 73.1 | 82.4 | 92.0 | 65.5 | 71.9 | 65.9 | 63.6 |
| MI21/MI2 | 77 | 52 | 39 | 37 | 31 | 109.2 | 22.5 | 57.8 | 43.0 |
| MI10/MI0.5 | 118 | 63 | 54 | 48 | 53 | 2.7 | 1.5 | 92.9 |  |
| TS (MPa) | 16.1 | 19.8 | 21.1 | 22.1 | 26.8 | 12.3 | 27.9 | 16.2 | 17.6 |
| % TS improvement vs GP |  | 19 | 6 | 5 | 18 |  |  |  |  |
| TE (%) | 633 | 789 | 849 | 870 | 899 | 654.6 | 840.0 | 651.0 | 665.0 |
| % TE improvement vs GP |  | 20 | 7 | 2 | 3 |  |  |  |  |
| ESCR (10% Igepal solution at 50 C.; 125 mils) | >1500 | >1500 | >1500 | >1500 | >1500 |  |  |  |  |
| ESCR (10% Igepal solution at 50 C.; 75 mils) 384 hrs |  |  |  |  |  |  |  | pass | pass |
| Smoothness (μ-inch) (wire extrusion at 1.5 m/s) | 24 | 35 | 38 | 46 | 700 | 15.0 | 353.5 | 77.3 | 45.4 |
| Qualitative smoothness | ++ | ++ | ++ | ++ | ++ |  | -- | ++ | ++ |
| Pressure head (psi) | 1245 | 1190 | 1190 | 1176 | 1170 |  |  |  |  |
| Motor amps (A) | 38 | 35 | 35 | 36 | 34 |  |  |  |  |
| Melt temperature (° C.) | 208 | 211 | 211 | 211 | 210 |  |  |  |  |

CS—comparative sample
ESCR—environmental stress cracking resistance
GP—gas phase
IE—inventive example

TABLE 4

Broad MWD MDPE/Narrow MWD LLDPE/MDPE Conductor Jackets

| | MDPE Examples | | | | | | |
|---|---|---|---|---|---|---|---|
| | CS-5 | IE-9 | IE-10 | IE-11 | CS-7 | CS-8 | CS-9 |
| Component B (DFH3580) | 94.113 | 47.01 | 49.9 | 39.9 | 29.9 | 99.9 | — |
| Component B1 (Dowlex 2036G) | — | 47.02 | 50 | 60 | 70 | — | 99.9 |
| Component B (DFH4580) | — | — | — | — | — | — | — |
| Component B1 (Dowlex 2645G) | — | — | — | — | — | — | — |
| Super Q | 0.2 | 0.2 | — | — | — | — | — |
| Component D (Dynamar FX 5912) | 0.017 | 0.1 | 0.1 | 0.1 | 0.1 | 0.1 | 0.1 |
| Component E (DFNA-0037BK) | 5.67 | 5.67 | — | — | — | — | — |
| Density (g/cm3) | 0.947 | 0.948 | 0.935 | 0.935 | 0.936 | 0.934 | 0.934 |
| MI2 (dg/min) | 0.65 | 1.5 | 1.5 | 0.94 | 1.78 | 0.64 | 2.42 |
| MI10 | 11.8 | 14.74 | 14.82 | 11.36 | 15.2 | 23.89 | 11.58 |
| MI0.5 | 0.068 | 0.26 | 0.27 | 0.41 | 0.17 | 0.076 | 0.62 |
| MI21 | 61.17 | 61.24 | 54.35 | 41.04 | 53.82 | 53.65 | 60.93 |
| MI21/MI2 | 94.9 | 40.83 | 36.23 | 43.7 | 30.24 | 84 | 23.93 |
| MI10/MI0.5 | 173.5 | 56.69 | 54.89 | 27.7 | 89.4 | 311 | 18.71 |
| TS (MPa) | 24.2 | 28.8 | 28.5 | 28.7 | 28.4 | 26.6 | 29.84 |
| % TS improvement vs GP | — | 19 | — | — | — | — | — |
| TE (%) | 836 | 962.6 | 886 | 863 | 892 | 866 | 894 |
| % TE improvement vs GP | — | 15 | — | — | — | — | — |
| ESCR (10% Igepal solution at 50 C.; 75 mils) 500 hrs | pass | pass | — | pass | pass | pass | — |
| ESCR (10% Igepal solution at 50 C.; 75 mils) 384 hrs | | | | | | | |
| Smoothness (μ-in.) (wire extrusion at 1.5 m/s) | 19.7 | 50.4 | 49.3 | 59.2 | 137.7 | 27.2 | 892.3 |
| Qualitative smoothness | ++ | ++ | ++ | ++ | − | ++ | − |
| Pressure head (psi) | 1400 | 1482 | 1522 | 1496 | 1544 | 1536 | 1435 |
| Motor amps (A) | 35 | 32 | 33 | 34 | 33 | 32 | 32 |
| Melt temperature (° C.) | 224.4 | 226.7 | 228.3 | 230 | 228.9 | 228.3 | 225.6 |

| | MDPE Examples | | | | | | |
|---|---|---|---|---|---|---|---|
| | IE-12 | CS-12 | CS-13 | IE-14 | CS-14 | CS-15 | IE-15 |
| Component B (DFH3580) | — | — | — | — | 94.113 | — | 70 |
| Component B1 (Dowlex 2036G) | — | — | — | — | — | 94.113 | 24.11 |
| Component B (DFH4580) | 51.71 | 94.113 | — | 70 | — | — | — |
| Component B1 (Dowlex 2645G) | 42.32 | — | 94.113 | 24.11 | — | — | — |
| Super Q | 0.2 | 0.2 | 0.2 | 0.2 | 0.2 | 0.2 | 0.2 |
| Component D (Dynamar FX 5912) | 0.1 | 0.017 | 0.017 | 0.017 | 0.017 | 0.017 | 0.017 |
| Component E (DFNA-0037BK) | 5.67 | 5.67 | 5.67 | 5.67 | 5.67 | 5.67 | 5.67 |
| Density (g/cm3) | 0.935 | 0.956 | 0.932 | 0.948 | 0.945 | 0.946 | 0.945 |
| MI2 (dg/min) | 0.9 | 0.88 | 0.93 | 0.92 | 0.84 | 2.68 | 1.36 |
| MI10 | 10.11 | 13.60 | 7.80 | 11.60 | 14.20 | 18.70 | 15.90 |
| MI0.5 | 0.15 | 0.11 | 0.20 | 0.14 | 0.10 | 0.63 | 0.20 |
| MI21 | 41.02 | 70.5 | 28.1 | 56.6 | 76.8 | 61.7 | 23.9 |
| MI21/MI2 | 45.83 | 80.1 | 30.3 | 61.5 | 91.8 | 23.0 | 17.5 |
| MI10/MI0.5 | 66.1 | 123.6 | 39.0 | 82.9 | 142.0 | 29.7 | 79.5 |
| TS (MPa) | 29.6 | 22.2 | 32.9 | 27.8 | 24.4 | | 26.0 |
| % TS improvement vs GP | 22.3 | | | | | | |
| TE (%) | 835 | 602 | 699 | 805 | 806 | | 807 |
| % TE improvement vs GP | — | | | | | | |
| ESCR (10% Igepal solution at 50 C.; 75 mils) 500 hrs | pass | | | | | | |
| ESCR (10% Igepal solution at 50 C.; 75 mils) 384 hrs | | | | pass | | | pass |
| Smoothness (μ-in.) (wire extrusion at 1.5 m/s) | 42.4 | 35.0 | 184.4 | 26.1 | 22.0 | 376.0 | 25.6 |
| Qualitative smoothness | ++ | ++ | −− | ++ | ++ | −− | ++ |
| Pressure head (psi) | 1678 | | | | | | |
| Motor amps (A) | 37 | | | | | | |
| Melt temperature (° C.) | 233.3 | | | | | | |

CS—comparative sample
ESCR—environmental stress cracking resistance
GP—gas phase
IE—inventive example Tables 2-4 show that it is possible mix components with differing I21/I2 viscosity profiles in order to meet and/or exceed the specification targets of conventional conductor jacketing compounds in terms of final I21/I2, melt index, density, mechanical properties, environmental stress cracking, and surface smoothness in particular.

The present disclosure advantageously expands the scope of base resins suitable to form conductor jacketing at high speed (i.e., extrusion greater than 1.02 m/s) having a surface smoothness from 20-80 μ-inch.

The extrusion characteristics of inventive examples 1-15 show unexpected extrusion behavior. It is known that polyethylene resins with broad MWD and long chain branching exhibit excellent processability, i.e., such polyethylene can be extruded at high line speeds with excellent surface smoothness. In contrast, polyethylene resins with narrow MWD exhibit a viscosity profile that, comparatively, lacks both melt strength and shear thinning behavior. Therefore, narrow MWD polyethylene polymers are limited on extrusion performance and generally result in conductor jacket with poor surface smoothness (i.e., surface smoothness greater than 80 µ-inch) when processed at greater than 1.02 m/s.

The inventive blend component surprisingly retains a good surface smoothness (20-80 µ-inch even at high content level (up to 70% wt.) of the narrow MWD polyethylene. The improved surface smoothness upon addition of narrow MWD polyethylene is unexpected, i.e., the surface smoothness in not a linear function of the weight percent, content of the narrow MWD polyethylene as shown by the data of Tables 2, 3 and 4. Furthermore, the inventive blend components, overall, show improved mechanical properties over the range of the proposed compositions.

It is specifically intended that the present disclosure not be limited to the embodiments and illustrations contained herein, but include modified forms of those embodiments including portions of the embodiments and combinations of elements of different embodiments as come with the scope of the following claims.

The invention claimed is:

1. A process for producing a conductor jacket comprising:
    blending a first ethylene-based polymer having an I21/I2 ratio from 55 to 85 with a second ethylene-based polymer having an I21/I2 ratio from 20 to 50;
    forming a blend component comprising from 20 wt % to 45 wt % of the first ethylene-based polymer, from 80 wt % to 55 wt % of the second ethylene-based polymer and optional carbon black, the blend component having a density from 0.925 g/cc to 0.955 g/cc and an I21/I2 ratio from 30 to 55;
    extruding the blend component over a conductor at a rate greater than 1.02 m/s; and
    forming a conductor jacket having a surface smoothness from 30 µ-inch to 80 µ-inch.

2. The process of claim 1 comprising blending a first linear low density polyethylene (LLDPE) having a density from 0.915 g/cc to 0.925 g/cc and an I21/I2 ratio from 73 to 77 with a second LLDPE having a density from 0.915 g/cc to 0.925 g/cc and an I21/I2 ratio from 30 to 35;
    forming a blend component comprising from 20 wt % to 45 wt % of the first LLDPE, from 70 wt % to 50 wt % of the second LLDPE and from 1 wt % to 10 wt % carbon black, the blend component having a density from 0.925 g/cc to less than 0.935 g/cc and an I21/I2 ratio from 30 to 55;
    extruding the blend component over the conductor at a rate greater than 1.02 m/s; and
    forming a conductor jacket having a surface smoothness from 30 µ-inch to 80 µ-inch.

3. The process of claim 2 comprising blending a first linear low density polyethylene (LLDPE) having a density from 0.915 g/cc to 0.925 g/cc and an I21/I2 ratio from 73 to 77 with a second LLDPE having a density from 0.915 g/cc to 0.920 g/cc and an I21/I2 ratio from 30 to 33;
    forming a blend component comprising from 23 wt % to 45 wt % of the first LLDPE, from 70 wt % to 50 wt % of the second LLDPE and from 1 wt % to 7 wt % carbon black, the blend component having a density from 0.925 g/cc to less than 0.935 g/cc and an I21/I2 ratio from 33 to 42;
    extruding the blend component over the conductor at a rate greater than 1.02 m/s; and
    forming a conductor jacket having a surface smoothness from 45 µ-inch to 80 µ-inch.

4. The process of claim 3 comprising forming a conductor jacket having a tensile strength from 20.0 MPa to 22.0 MPa and a tensile elongation from 825% to 910%.

5. The process of claim 2 comprising blending a first linear low density polyethylene (LLDPE) having a density from 0.915 g/cc to 0.925 g/cc and an I21/I2 ratio from 73 to 77 with a second LLDPE having a density from 0.915 g/cc to 0.920 g/cc and an I21/I2 ratio from 30-33;
    forming a blend component comprising from 23 wt % to 45 wt % of the first LLDPE, from 70 wt % to 50 wt % of the second LLDPE, and from 1 wt % to 7 wt % carbon black, the blend component having a density from 0.925 g/cc to less than 0.935 g/cc and an I21/I2 from 35 to 55;
    extruding the blend component over the conductor at a rate greater than 1.02 m/s; and
    forming a conductor jacket having a surface smoothness from 35 µ-inch to 50 µ-inch.

6. The process of claim 5 comprising forming a conductor jacket having a tensile strength from 19.0 MPa to 23.0 MPa and a tensile elongation from 780% to 870%.

7. The process of claim 1 comprising blending a first medium density polyethylene (MDPE) having a density from 0.933 g/cc to less than 0.937 g/cc and an I21/I2 from 55-75 with a second ethylene-based polymer having a density from 0.920 g/cc to 0.935 g/cc and an I21/I2 ratio from 25-40;
    forming a blend component comprising from 35 wt % to 55 wt % of the first MDPE, from 50 wt % to 40 wt % of the second ethylene-based polymer, and from 1 wt % to 7 wt % carbon black, the blend component having a density from 0.935 g/cc to less than 0.945 g/cc and an I21/I2 from 35 to 55;
    extruding the blend component over the conductor at a rate greater than 1.02 m/s; and
    forming a conductor jacket having a surface smoothness from 40 µ-inch to 60 µ-inch.

8. The process of claim 7 comprising forming a conductor jacket having a tensile strength from 27 MPa to 30 MPa and a tensile elongation from 830% to 970%.

9. The process of claim 7 comprising blending a first medium density polyethylene (MDPE) having a density from 0.933 g/cc to 0.937 g/cc and an I21/I2 from 63-67 with a second MDPE having a density from 0.933 g/cc to 0.937 g/cc and an I21/I2 ratio from 25-30;
    forming a blend component comprising from 35 wt % to 50 wt % of the first MDPE, from 65 wt % to 45 wt % of the second MDPE, and from 1 wt % to 7 wt % carbon black, the blend component having a density from 0.935 g/cc to less than 0.945 g/cc and an I21/I2 from 40 to 45;
    extruding the blend component over the conductor at a rate greater than 1.02 m/s; and
    forming a conductor jacket having a surface smoothness from 50 µ-inch to 60 µ-inch.

10. The process of claim 9 comprising forming a conductor jacket having a tensile strength from 27 MPa to 30 MPa and a tensile elongation from 860% to 970%.

11. A process for producing a conductor jacket comprising:
    blending a first ethylene-based polymer having an I21/I2 ratio from 55 to 85 with a second ethylene-based polymer having an I21/I2 ratio from 20 to 50;
    forming a blend component comprising from 20 wt % to 70 wt % of the first ethylene-based polymer, from 80 wt % to 20 wt % of the second ethylene-based polymer and optional carbon black, the blend component having a density from 0.925 g/cc to 0.955 g/cc and an I21/I2 ratio from 15 to 65;

extruding the blend component over a conductor at a rate greater than 1.02 m/s; and forming a conductor jacket having a surface smoothness from 20 µ-inch to 80 µ-inch.

12. The process of claim 11 comprising blending a first linear low density polyethylene (LLDPE) having a density from 0.915 g/cc to 0.925 g/cc and an I21/I2 ratio from 73 to 77 with a second LLDPE having a density from 0.915 g/cc to 0.925 g/cc and an I21/I2 ratio from 20 to 35;

forming a blend component comprising from 50 wt % to 70 wt % of the first LLDPE, from 49 wt % to 20 wt % of the second LLDPE and from 1 wt % to 10 wt % carbon black, the blend component having a density from 0.925 g/cc to less than 0.935 g/cc and an I21/I2 ratio from 30 to 60;

extruding the blend component over the conductor at a rate greater than 1.02 m/s; and forming a conductor jacket having a surface smoothness from 30 µ-inch to 80 µ-inch.

13. The process of claim 11 comprising blending a first medium density polyethylene (MDPE) having a density from 0.933 g/cc to less than 0.937 g/cc and an I21/I2 from 55 to 75 with a second medium density polyethylene (MDPE) having a density from 0.935 g/cc to 0.940 g/cc and an I21/I2 ratio from 25 to 40;

forming a blend component comprising from 50 wt % to 70 wt % of the first MDPE, from 49 wt % to 20 wt % of the second MDPE, and from 1 wt % to 10 wt % carbon black, the blend component having a density from 0.935 g/cc to 0.950 g/cc and an I21/I2 from 15 to 50;

extruding the blend component over the conductor at a rate greater than 1.02 m/s; and forming a conductor jacket having a surface smoothness from 20 µ-inch to 60 µ-inch.

14. The process of claim 11 comprising blending a first medium density polyethylene (MDPE) having a density from 0.933 g/cc to less than 0.937 g/cc and an I21/I2 from 55 to 75 with a second linear low density polyethylene (LLDPE) having a density from 0.915 g/cc to 0.925 g/cc and an I21/I2 ratio from 20 to 40;

forming a blend component comprising from 50 wt % to 70 wt % of the first MDPE, from 49 wt % to 20 wt % of the second LLDPE, and from 1 wt % to 10 wt % carbon black, the blend component having a density from 0.935 g/cc to 0.950 g/cc and an I21/I2 from 40 to 65;

extruding the blend component over the conductor at a rate greater than 1.02 m/s; and forming a conductor jacket having a surface smoothness from 20 µ-inch to 60 µ-inch.

* * * * *